(12) United States Patent
Tirelli et al.

(10) Patent No.: US 7,654,477 B2
(45) Date of Patent: Feb. 2, 2010

(54) PULVERIZATION PROCESS OF A VULCANIZED RUBBER MATERIAL

(75) Inventors: Diego Tirelli, Milan (IT); Michele Galbusera, Milan (IT); Franco Peruzzotti, Milan (IT); Cristiano Puppi, Milan (IT); Stefano Testi, Milan (IT); Antonio Monterosso, Milan (IT); Matteo Di Biase, Milan (IT)

(73) Assignee: Pirelli & C. S.p.A., Milan (IT)

( * ) Notice: Subject to any disclaimer, the term of this patent is extended or adjusted under 35 U.S.C. 154(b) by 581 days.

(21) Appl. No.: 10/537,172

(22) PCT Filed: Oct. 14, 2003

(86) PCT No.: PCT/EP03/11385

§ 371 (c)(1),
(2), (4) Date: Nov. 21, 2005

(87) PCT Pub. No.: WO2004/050321

PCT Pub. Date: Jun. 17, 2004

(65) Prior Publication Data

US 2006/0151643 A1    Jul. 13, 2006

(30) Foreign Application Priority Data

Dec. 2, 2002  (WO) .................. PCT/EP02/13614

(51) Int. Cl.
*B02C 23/06* (2006.01)
*C08J 11/14* (2006.01)
*C08J 3/12* (2006.01)

(52) U.S. Cl. .......... 241/16; 241/23; 241/24.17; 521/45; 521/45.5; 528/499; 528/502 F

(58) Field of Classification Search ........... 521/45.5; 241/16, 24.17, 23; 528/499, 502 F
See application file for complete search history.

(56) References Cited

U.S. PATENT DOCUMENTS

| | | | |
|---|---|---|---|
| 2,412,586 A | 12/1946 | Knowland et al. | |
| 2,853,742 A * | 9/1958 | Dasher | 521/45.5 |
| 3,190,565 A | 6/1965 | Jayne, Jr. | |
| 4,090,670 A | 5/1978 | Bennett | |
| 4,157,790 A * | 6/1979 | Benn et al. | 241/22 |

(Continued)

FOREIGN PATENT DOCUMENTS

DE       40 09 902 A1    10/1991

(Continued)

OTHER PUBLICATIONS

Nazy et al.; "Cryopulverizing"; Chemtech, vol. 6, No. 3, pp. 200-203, (1976).

*Primary Examiner*—Fred M Teskin
(74) *Attorney, Agent, or Firm*—Finnegan, Henderson, Farabow, Garrett & Dunner, L.L.P.

(57) ABSTRACT

A process for producing a rubber powder from a vulcanized rubber material by the steps of: a) feeding a grinding device with the vulcanized rubber material; b) contacting the vulcanized rubber material with at least one liquid coolant; c) introducing at least one grinding aid additive into the grinding device; d) operating the grinding device so as to grind the vulcanized rubber material to form a rubber powder, and e) discharging the rubber powder from the extruder.

50 Claims, 3 Drawing Sheets

U.S. PATENT DOCUMENTS

| | | | |
|---|---|---|---|
| 4,607,796 A | 8/1986 | Enikolopov et al. | |
| 4,607,797 A | 8/1986 | Enikolopow et al. | |
| 4,614,310 A | 9/1986 | Tloczynski et al. | |
| 4,625,922 A * | 12/1986 | Brubaker et al. | 241/17 |
| 4,650,126 A | 3/1987 | Feder et al. | |
| 4,968,463 A | 11/1990 | Levasseur | |
| 5,154,361 A | 10/1992 | Willoughby | |
| 5,299,744 A * | 4/1994 | Garmater | 241/19 |
| 5,395,055 A | 3/1995 | Shutov et al. | |
| 5,704,555 A | 1/1998 | Arastoopour | |
| 5,735,471 A * | 4/1998 | Muro | 241/23 |
| 5,743,471 A | 4/1998 | Ivanov | |
| 2002/0125352 A1 * | 9/2002 | Ivanov et al. | 241/23 |

FOREIGN PATENT DOCUMENTS

| | | |
|---|---|---|
| EP | 1 201 389 A1 | 5/2002 |
| GB | 871923 | 7/1961 |
| GB | 1424768 | 2/1976 |
| JP | 6-179215 A | 6/1994 |
| WO | WO-01/85414 A1 | 11/2001 |

* cited by examiner

PULVERIZATION PROCESS OF A VULCANIZED RUBBER MATERIAL

CROSS REFERENCE TO RELATED APPLICATIONS

This application is a national phase application based on PCT/EP2003/011385, filed Oct. 14, 2003, which claims the priority of European Application No. PCT/EP02/13614, filed Dec. 2, 2002, the content of both of which is incorporated herein by reference.

BACKGROUND OF THE INVENTION

1. Field of the Invention

The present invention relates to a process for producing a rubber powder from a vulcanized rubber material.

In particular, the present invention relates to a process for pulverizing a vulcanized rubber material by using a grinding device.

More in particular, the present invention relates to a process for pulverizing a vulcanized rubber material comprising a discarded rubber material.

Even more in particular, the present invention relates to a process for pulverizing a vulcanized rubber material comprising a discarded rubber material including discarded tyres previously torn to shreds.

2. Description of the Related Art

The increased production of industrial rubber products has resulted in the accumulation of large amounts of rubber wastes which per se do not find any practical applications and are generally disposed in dedicated landfills with the main drawbacks of environment pollution as well as of the need for large dedicated areas for storing said wastes.

Therefore, the reclaiming of vulcanized rubber material into a product, which can be advantageously reused, is a widely discussed issue and a long-felt problem to be solved.

Used vulcanized rubber material, such as waste rubber, old tyres and industrial rubber products, can be comminuted and added to rubber mixtures to be employed in a plurality of applications. This is particularly advantageous since important amounts of used vulcanized rubber material can be reused and, moreover, corresponding remarkable amounts of raw materials can be saved by replacing them with said discarded material.

The use in a rubber composition of a comminuted vulcanized rubber, whose particle size generally does not exceed 500 µm, does not remarkably impair the quality of the final product.

However, according to the known technologies available on the market, fine powders can be obtained from rubber material at the expense of large amounts of energy.

Reclaiming processes of used rubber material which are currently employed include: chemical reclaiming processes such as pyrolysis and devulcanization; thermal reclaiming processes such as extrusion, injection moulding and pressure moulding; mechanical reclaiming processes such as granulation, densification, agglomeration and pulverization.

Document U.S. Pat. No. 4,090,670 discloses the recovery of rubber from scrap vulcanized rubber tyres by devulcanization of the rubber tyres and subsequent removal of the devulcanized material, e.g. by rasping. The devulcanization is obtained by raising the surface temperature of the vulcanized rubber material.

Document U.S. Pat. No. 4,968,463 discloses the reclamation of thermoplastic material including the steps of: shredding to about one hundred millimiters, grinding to under about 40 millimeters, drying, pre-heating from 80° C. to 160° C., kneading at 120° C. to 250° C. and injection moulding or extruding.

A method of pulverizing natural or synthetic rubber materials is known, for instance, from document U.S. Pat. No. 3,190,565 which discloses the comminution thereof in mills provided with knife blades in the presence of antiagglomerating agents (in the form of polyolefin fines) that inhibit the sticking of the comminuted material to the cutting blades.

A further method of making powders from industrial rubbers consists in comminuting thereof by means of shear forces.

Document GB-1,424,768 discloses a plunger-type device provided with a rotating member so that the rubber material is crushed in the minimal gap between the rotating member and the inside wall of said device.

Document U.S. Pat. No. 4,157,790 discloses a process for the production of rubber powder having a particle size of from about 200 to 1,500 µm, said process comprising the step of providing small additions of powdering agents in order to obtain adequate fluidity of the rubber powder. A carrier gas is used during size-reduction which is carried out, for instance, by the grinding plates of a Pallmann mill. The increase in temperature which occurs in the size-reduction machine is minimized by cooling the carrier gas, e.g. at a temperature of about 5° C.

Document U.S. Pat. No. 4,650,126 discloses a process for grinding to a particle size of less than about 1 mm in diameter a soft and tacky polymeric material in the presence of a grinding aid in an attrition mill having counter-rotating grinding elements adjustably spaced apart. The mill temperature is adjusted so that nearly all of the grinding aid is retained on the softened polymer particles, thus improving polymer flow and reducing to a minimum the amount of loose grinding aid to be disposed of. Air is drawn through the mill to serve as the material carrier medium and at the same time to cool the mill, if required.

Document U.S. Pat. No. 2,412,586 relates to the fine grinding of rubber scrap with high grinding and screening efficiency. Said document discloses a cyclic process in which the rubber stock, with preliminary chopping if necessary, is continuously fed to a grinding mill together with a regulated amount of water and then subjected to the grinding operation in the presence of the added water, the resulting ground stock passed by a conveyer to a screen for screening out the fine particles, and the oversize material from the screen returned to the grinder for further grinding. According to said document the amount of water required for most efficient grinding or screening varies somewhat with the type of scrap being ground and with the fineness to which the scrap is to be ground.

A further method of producing finely dispersed powders from used rubber materials is the cryogenic destruction (e.g. Chemical Technology, Cryopulverizing, T. Nazy, R. Davis, 1976, 6, N° 3, pages 200-203). According to said method the rubber material is cooled to very low temperatures by using liquid nitrogen or solid carbon dioxide and then subjecting the cooled material to impact or cutting. This method produces finely dispersed powders having particle dimensions less than 500 µm, but it is very expensive due to the presence of a plant dedicated to liquid nitrogen production.

A further method of making powders from rubber materials consists in using an extrusion device of the single-screw or multiple-screw type.

For instance, document U.S. Pat. No. 4,607,797 discloses the pulverization of used polymers in an extrusion apparatus wherein the used material is heated to above its melting temperature in a first zone of said extrusion apparatus and cooled to below its solidification temperature with simultaneous pre-crushing and pulverizing of the solidified material in a second zone of said apparatus to form a powdered material. The action of the screw of the extruder is used to convey the material through the barrel of the extruder, while pulverizing disks mounted on the screw in the second cooling zone perform the pre-crushing and pulverizing of said material.

Document U.S. Pat. No. 5,743,471 discloses an extruder for solid state shear extrusion pulverization of polymeric materials comprising a feed zone, a heating zone adjacent to the feed zone, a powder formation zone adjacent to the heating zone and a powder discharge zone adjacent to the powder formation zone. Furthermore, the extruder is provided with temperature adjustment means for heating the polymeric material to a temperature lower than the decomposition temperature of the polymeric material in the heating zone and for maintaining the polymeric material below its melting point in the powder formation zone, but at a temperature above its glass transition temperature in the powder formation zone to inhibit the formation of agglomerates.

Documents U.S. Pat. Nos. 4,607,796; 5,395,055; 5,704,555 and JP 6-179215 disclose further processes according to which the extruder is provided with heating and cooling zones.

SUMMARY OF THE INVENTION

The Applicant has perceived that, in processes for producing powders from vulcanized rubber materials by using a grinding device, the control of the temperature is essential to obtain high grinding yields in fine particles which do not negatively affect the mechanical properties—e.g. tensile strength, elongation at break, abrasion resistance—of the rubber compositions they are added to.

According to the present invention, the term "grinding device" is used to indicate any machine which is suitable for carrying out the size-reduction of a vulcanized rubber material by impact, cutting, tearing and/or shearing thereof. In order to increase the grinding yield in fine particles, the Applicant has perceived that the rubber material has to be cooled so that during the grinding step the rubber particles do not stick and agglomerate.

Furthermore, the Applicant has perceived that a suitable control of the rubber material temperature, i.e. a decrease thereof during the grinding step, is particularly advantageous also in terms of energy to be transferred to the rubber material for the grinding thereof. In more details, the Applicant has perceived that, by controlling the temperature of the rubber material, the mechanical energy which is supplied during the process can be used to give rise to shear stresses on the rubber particles so that an efficient grinding thereof is achieved. This means that said energy is not spent for carrying out the softening or melting of the rubber material and the devulcanizing thereof, but results in obtaining high grinding yields in very fine particles of the rubber material.

Furthermore, the Applicant has perceived that, in order to perform a very efficient cooling of the rubber material, it is not sufficient to provide the grinding device—e.g. the walls thereof—with a cooling circuit which can remove a predetermined heat amount from the rubber material by contacting the latter with the cooling circuit—e.g. with the cooled walls of the grinding device. In particular, the Applicant has perceived that part of the heat produced during the grinding step has to be removed by directly acting on the rubber material, i.e. by carrying out a cooling of the latter from the inside thereof.

The Applicant has further found that it is possible to efficiently cool the rubber material by contacting the rubber material with a liquid coolant.

According to the present invention, the term "liquid coolant" is used to indicate any coolant which is liquid at environmental temperature (i.e. at 20-25° C.) and at atmospheric pressure.

Preferably, the coolant is a liquid which at least partially evaporates during the grinding of the vulcanized rubber material so that at least part of the heat, which is produced during the grinding action, is dissipated.

In more details, the Applicant has found that, by introducing at least a predetermined amount of a liquid coolant into the grinding device so as to contact the rubber material during the advancing and grinding thereof, said coolant dissipates a part of the heat produced during the grinding step and thus efficiently cools the rubber material while being ground.

Furthermore, in order to increase the grinding yield in fine particles of the rubber material, the Applicant has found that at least one grinding aid additive can be advantageously introduced into the grinding device.

In particular, the Applicant has found that a synergistic effect is obtained when at least one liquid coolant and one grinding aid additive are introduced into the grinding device, said additive favourably supporting the grinding operation. As a consequence of this synergistic effect, the grinding yield in fine particles advantageously increases.

The Applicant believes that said favourable result is connected to the fact that: a) the grinding aid additives avoid the reagglomeration of the fine rubber particles produced during the process as well as their sticking to the grinding device, and b) the grinding aid additives contribute to the grinding action thanks to their hardness and/or abrasiveness. The present invention relates to a process for producing a rubber powder from a vulcanized rubber material comprising the steps of:

feeding a grinding device with said vulcanized rubber material;

contacting said vulcanized rubber material with at least one liquid coolant;

introducing at least one grinding aid additive into said grinding device;

operating the grinding device so as to grind said vulcanized rubber material to form said rubber powder, and discharging said rubber powder from said grinding device.

The process according to the present invention further comprises the step of introducing the liquid coolant into the grinding device.

Preferably, the grinding aid additive is introduced into the grinding device through at least one feeding inlet together with the vulcanized rubber material.

Preferably, the introduction of the liquid coolant into the grinding device is carried out by means of at least one further feeding inlet which is different from the feeding inlet of the vulcanized rubber material and of the grinding aid additive.

Preferably, said at least one further feeding inlet is an injection point for the liquid coolant.

Alternatively, the introduction of the liquid coolant into the grinding device is carried out by means of said at least one feeding inlet so that the liquid coolant, the vulcanized rubber material and the grinding aid additive are fed into the extruder through the same feeding inlet.

According to an embodiment of the invention, the introduction of the liquid coolant into the grinding device is carried out by dripping.

According to a further embodiment, the step of contacting comprises the step of wetting the vulcanized rubber material with the liquid coolant before the step of feeding.

According to a further embodiment, the step of contacting comprises the step of impregnating the vulcanized rubber material with the liquid coolant before the step of feeding.

According to the invention, when the liquid coolant introduced into the grinding device contacts the rubber material during the grinding thereof, the coolant is able to remove the heat, or at least part of it, at the very beginning of its production so that a more efficient and effective control of the rubber material temperature can be performed with respect to the case in which a single external cooling, i.e. a cooling carried out by means of a cooling circuit provided, for instance, within the walls of the grinding device, is performed.

An example of grinding device according to the present invention is a mill, e.g. a cutting mill, a refiner mill, a hammer mill, a grinding mill, a pin mill, a counter-rotating pin mill, a cage mill, a turbo mill, or an attrition mill.

An alternative grinding device is an extruder.

A further alternative grinding device is a shredder or a granulator.

A further alternative grinding device is a Banbury mixer.

The process of the present invention is suitable for pulverizing any vulcanized rubber materials, such as synthetic or natural polymers, copolymers, homopolymers, natural or synthetic rubber and mixtures thereof.

Preferably, the process of the present invention is suitable for pulverizing the vulcanized rubber material deriving from discarded tyres.

In case a discarded tyre is used, the latter is previously torn to shreds of remarkable size dimensions, for instance of about 3-5 cm in size.

Successively said shreds undergo a further size-reduction operation, which reduces the tyre pieces to chips for example of about 6-8 mm, while dedicated working operations are carried out in order to remove steel (e.g. by means of a magnetic separation) and textile material (e.g. by means of a pneumatic separation) from said chips. The reduction of the tyre shreds to tyre pieces of lower dimensions allows that nearly 99% of the metallic material and a first amount of the textile material are separated from the rubber material.

Successively, said chips are subjected to a pulverizing operation in accordance with the present invention so as to obtain a rubber powder, the latter having an average dimension lower than 1 mm.

Alternatively, the discarded tyre torn to shreds (of about 50-100 mm) is directly fed into the grinding device (e.g. a grinding wheel mill) in which the pulverizing operation in accordance with the present invention is carried out. According to said embodiment, part of the material exiting from the grinding device is recycled thereinto in order to provide for a further grinding of said material so as to further reduce the size thereof.

Successively, the rubber powder exiting from the grinding device undergoes a screening operation so as to separate the remaining amount of textile material from the rubber material.

The Applicant has found that the use of a grinding aid additive advantageously increases the sieving yield of the textile material from the rubber material at the end of the pulverization process.

In more details, the Applicant has found that by using a grinding aid additive it is possible to efficiently and easily separate the textile material—i.e. the fibers—from the rubber powder, since the textile material tends to agglomerate and spontaneously separate by forming flakes upon the screens.

Therefore, during subsequent screening, the agglomerated fibers are retained on the screens and can be easily removed.

According to the present invention, the obtained rubber powder is substantially devoid of the textile material and the waste of rubber material is remarkably reduced with respect to traditional pulverization processes wherein the textile material is separated, e.g. by means of cyclone air separators, and a remarkable amount of rubber material can not be recovered.

Preferably, the liquid coolant according to the present invention is water.

More preferably, said liquid coolant is water at a temperature not greater than 30° C. Even more preferably, said water is at a temperature comprised between 5° C. and 20° C.

Alternatively, the liquid coolant according to the present invention is an aqueous emulsion or suspension of at least one polymeric material, e.g. an elastomer (such natural rubber) or a resin.

Preferably, the liquid coolant is a non-cryogenic coolant.

Preferably, the liquid coolant is continuously fed to the grinding device.

The use of water as liquid coolant is particularly preferred not only from an economical and practical point of view, but also for the fact that the cooling action is particularly efficient because of water evaporation. In fact, because of the heat production due to the grinding action on the rubber material, the water introduced into the grinding device dissipates a part of the heat produced during said grinding action and evaporates. Therefore, the rubber powder discharged from the grinding device is substantially dry.

According to the present invention, the coolant is preferably introduced into the grinding device in an amount not greater than 20% by weight with respect to the amount of the rubber material. More preferably, the coolant amount is not greater than 10% by weight with respect to the amount of the rubber material.

According to a further aspect of the present invention, the temperature of the rubber material contained within the grinding device has to be maintained below its melting or softening temperature so that the rubber particles do not increase their tackiness during the grinding thereof and do not agglomerate.

In particular, the Applicant has perceived that the rubber material introduced into the grinding device and ground thereinto has to be suitably cooled by means of the liquid coolant mentioned above so that, at the exit of the grinding device, the temperature of the rubber powder is preferably not greater than 100° C., more preferably not greater than 60° C.

Preferably, the grinding aid additives can be selected from: silica, silicates (e.g. talc, mica, clay), finely divided metal oxides or carbonates (e.g. calcium carbonate, zinc oxide, magnesium oxide, alumina) and mixtures thereof.

According to the present invention, the grinding aid additive is preferably introduced into the grinding device in an amount not greater than 20% by weight, more preferably from 0.5% to 10% by weight, with respect to the amount of the rubber material.

According to an embodiment of the present invention, the grinding device is an extruder which comprises a barrel and at least one screw rotatably mounted into said barrel.

According to said embodiment, preferably the step of operating the extruder comprises at least one step of conveying the vulcanized rubber material along the extruder and at least one step of grinding the vulcanized rubber material within the extruder.

Preferably, the step of contacting the rubber is carried out by introducing the liquid coolant into the extruder barrel, said introduction being performed during at least one step of conveying the vulcanized rubber material along the extruder.

More preferably, the step of introducing the coolant into the extruder barrel is performed in association with at least one step of grinding the vulcanized rubber material within the extruder. More specifically, the step of introducing is performed during the step of grinding; alternatively, the step of introducing can be performed before the step of grinding, or both before and during the step of grinding.

Generally, the extruder is provided with at least one feeding inlet for the introduction thereinto of the rubber material previously reduced into shreds.

Preferably, the extruder is provided with a main feeding hopper which is located in correspondence of a first portion of the extruder screw.

According to an embodiment of the present invention, the rubber material reduced into shreds is introduced into the extruder barrel by means of said main feeding. hopper.

Preferably, the extruder is further provided with at least one further feeding inlet, which is located in correspondence of a further portion of the extruder screw, at a predetermined distance from said main feeding hopper.

According to a further embodiment of the present invention, part of the rubber material reduced into shreds is introduced into the extruder barrel by means of said at least one further feeding inlet. According to said embodiment, said at least one further feeding inlet is a lateral feeding inlet.

Preferably, the rubber material is continuously introduced into the extruder.

According to a preferred embodiment of the present invention, the liquid coolant is fed to the extruder through said at least one further feeding inlet. Preferably, said at least one further feeding inlet is an injection point of the liquid coolant to be introduced into the extruder.

Alternatively, the liquid coolant is fed to the extruder through said at least one lateral feeding inlet. According to a further embodiment, the liquid coolant and the rubber material can be introduced together into said at least one lateral feeding inlet.

Alternatively, the liquid coolant is fed to the extruder through the main feeding hopper.

Generally, the extruder screw comprises a plurality of conveying elements and kneading elements which are assembled according to a predetermined sequence, the latter depending on the kind of material to be ground as well as on the grinding yield to be achieved. In more details, the conveying elements have the function of moving the rubber material along the extruder barrel while the kneading elements have the function of grinding the rubber material, i.e. of transferring to the rubber material the mechanical energy necessary for carrying out the desired particle size reduction. Furthermore, the kneading elements have the function of mixing the liquid coolant with the rubber material.

According to an embodiment of the present invention, the liquid coolant is preferably fed to the extruder through a further feeding inlet positioned in correspondence of at least one kneading element. More preferably, said further feeding inlet is an injection point.

According to a further embodiment of the present invention, the liquid coolant is fed to the extruder through a further feeding inlet positioned in correspondence of a conveying element which is located immediately upstream of a kneading element. This solution is particularly preferred since the kneading element can be suitably cooled.

Therefore, the introduction of the liquid coolant in correspondence of at least one kneading element or immediately upstream thereof is a very advantageous configuration since the liquid coolant is directly introduced into the extruder zones where the grinding step is performed and a heat amount is produced.

Furthermore, according to the present invention, it is also possible to selectively cool down only the kneading elements which, following to their position along the longitudinal extension of the screw as well as to the specific rubber material to be pulverized, transfer to the rubber material the highest mechanical shears and are the most effective in the grinding action thereof.

Preferably, the liquid coolant is introduced into the extruder barrel by injection through said at least one injection point.

Alternatively, the liquid coolant is introduced into the extruder by dripping. In that case, the liquid coolant is fed to the barrel by means of the main feeding hopper and/or of at least one lateral feeding inlet.

Alternatively, the rubber material introduced into the extruder in the form of shreds of a predetermined granulometry is previously wet or impregnated with the liquid coolant. This means that the step of contacting the vulcanized rubber material with the liquid coolant occurs before the introduction of the rubber material into the extruder.

Preferably, the grinding aid additives are introduced into the extruder by means of said at least one further feeding inlet. More preferably, said additives are introduced into the extruder by means of said at least one lateral feeding inlet.

Alternatively, said additives are introduced into the extruder by means of said main feeding hopper together with the rubber material.

Preferably, said additives are introduced into the extruder by means of a gravimetric metering device.

The process of the present invention allows that high grinding yields in fine particles can be achieved in only one pass—i.e. without recycling the obtained rubber powder—while maintaining the process working temperature at a value remarkably higher than the working temperature of the liquid nitrogen. In other words, in only one pass, the process of the present invention allows to obtain grinding yields in fine particles which are comparable with those obtained with the cryogenic techniques, but with the advantage that the process of the present invention allows important energy and cost savings, also in terms of apparatuses to be employed.

Therefore, in only one pass, the process of the present invention allows to obtain a grinding yield greater than 50% in particles having average diameter lower than 600 µm (i.e. 30 mesh) and a grinding yield greater than 40% in particles having average diameter lower than 425 µm (i.e. 40 mesh). Furthermore, a grinding yield greater than 20% in particles having average diameter lower than 200 µm can be obtained.

According to a further embodiment of the present invention, the process comprises the step of sieving the rubber powder exiting from the grinding device. Preferably, the rubber particles having average diameter greater than 1 mm are recycled into the grinding device.

Therefore, according to said further embodiment, the process of the present invention further comprises the step of recycling at least a part of the rubber powder exiting from the grinding device.

BRIEF DESCRIPTION OF THE DRAWINGS

The present invention is now further illustrated with reference to the attached figures, wherein.

DETAILED DESCRIPTION OF THE INVENTION

Figure 1:
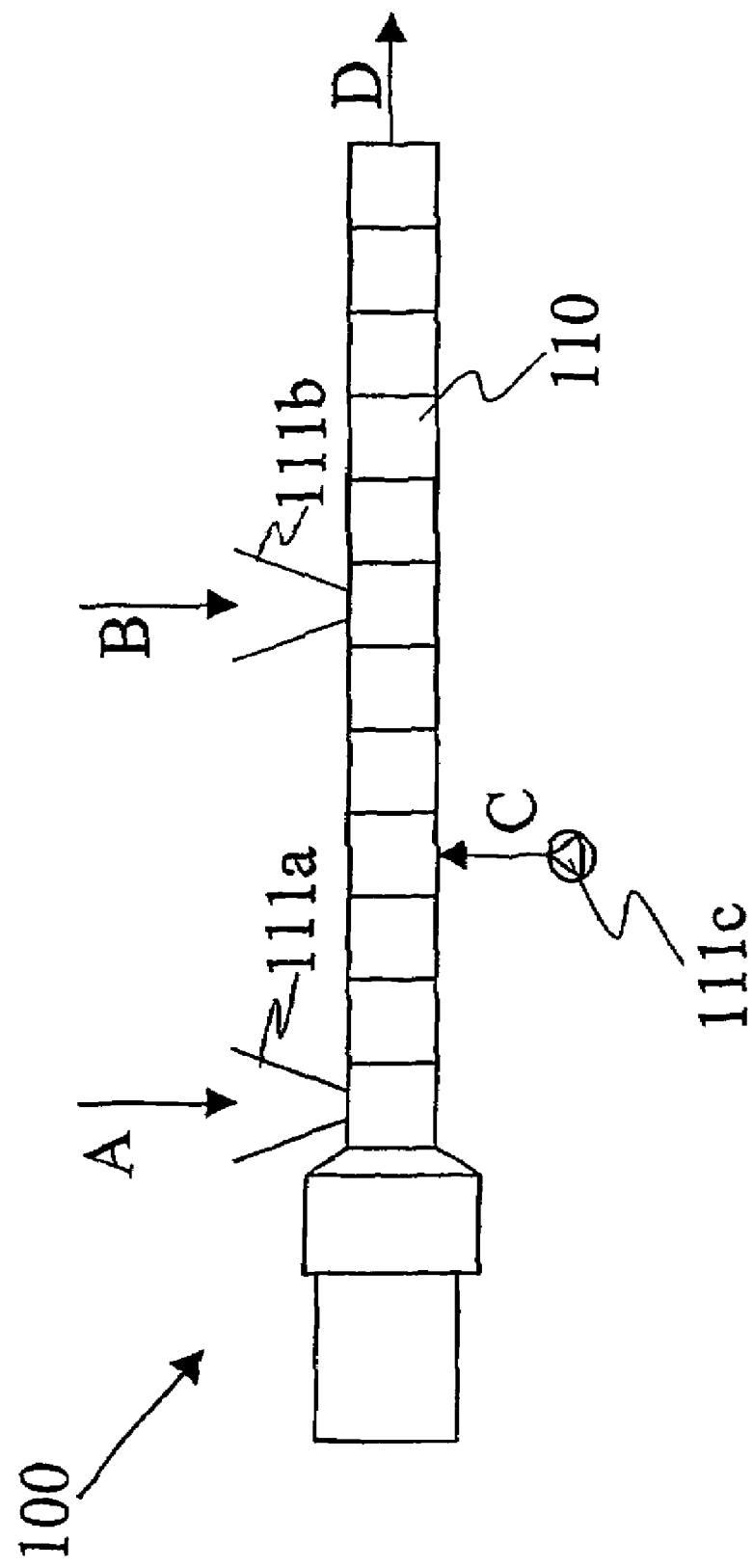
FIG. 1 is a schematic diagram of a process according to the present invention wherein the grinding device is an extruder.

FIG. 1 schematically shows a plant 100 for producing a rubber powder from a vulcanized rubber material according to one embodiment of the present invention.

Plant 100 comprises an extruder 110 which is provided with at least one feeding inlet.

In more details, according to the embodiment shown in FIG. 1, the extruder 110 comprises a main feeding hopper 111a for the introduction of the vulcanized rubber material (see arrow A) to be ground into powder.

According to said embodiment, the extruder 110 further comprises a lateral feeding inlet 111b and an injection point 111c for the introduction into the extruder of at least one grinding aid additive (see arrow B) and a liquid coolant (see arrow C) respectively.

The extruder according to the present invention can further comprise a cooling circuit within the walls of the extruder barrel so that the rubber material can be cooled down also from the outside, i.e. by contacting the cooled barrel walls.

At the extruder end opposite to the main feeding hopper, the vulcanized rubber powder is discharged from the extruder 110 as indicated by arrow D.

According to an embodiment (not shown) of the invention, the discharged rubber powder is conveyed to at least one sieve so that part of the powder can be recycled into the extruder, preferably into the main feeding hopper. Preferably, the rubber particles having average diameter greater than 1 mm are recycled.

Preferably, the extruder 110 is a co-rotating twin-screw extruder.

The vulcanized rubber material to be ground into a powder according to the process of the present invention may comprise at least a natural or synthetic diene elastomeric polymer, e.g. obtained by solution polymerization, emulsion polymerization or gas-phase polymerization of one or more conjugated diolefins, optionally blended with at least one comonomer selected from monovinylarenes and/or polar comonomers in an amount of not more than 60% by weight.

The conjugated diolefins generally contain from 4 to 12, preferably from 4 to 8 carbon atoms, and may be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene, or mixtures thereof.

Monovinylarenes which may optionally be used as comonomers generally contain from 8 to 20, preferably from 8 to 12 carbon atoms, and may be selected, for example, from: styrene; 1-vinylnaphthalene; 2-vinylnaphthalene; various alkyl, cycloalkyl, aryl, alkylaryl or arylalkyl derivatives of styrene such as, for example, α-methylstyrene, 3-methylstyrene, 4-propylstyrene, 4-cyclohexylstyrene, 4-dodecylstyrene, 2-ethyl-4-benzylstyrene, 4-p-tolylstyrene and 4-(4-phenylbutyl)styrene, or mixtures thereof.

Polar comonomers which may optionally be used may be selected, for example, from: vinylpyridine, vinylquinoline, acrylic and alkylacrylic acid esters, nitriles, or mixtures thereof, such as, for example, methyl acrylate, ethyl acrylate, methyl methacrylate, ethyl methacrylate, acrylonitrile, or mixtures thereof.

Preferably, the diene elastomeric polymer may be selected, for example, from: cis-1,4-polyisoprene (natural or synthetic, preferably natural rubber), 3,4-polyisoprene, poly(1,3-butadiene) (in particular poly(1,3-butadiene) with a high 1,4-cis content), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

Alternatively, the vulcanized rubber material to be ground into a powder according to the process of the present invention may comprise at least an elastomeric polymer which may be selected from elastomeric polymers of one or more monoolefins with an olefinic comonomer or derivatives thereof. The monoolefins may be selected from: ethylene and a-olefins generally containing from 3 to 12 carbon atoms, such as, for example, propylene, 1-butene, 1-pentene, 1-hexene, 1-octene, or mixtures thereof. The following are preferred: copolymers between ethylene and an α-olefin, optionally with a diene; isobutene homopolymers or copolymers thereof with small amounts of a diene, which are optionally at least partially halogenated. The diene optionally present generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene, or mixtures thereof. Among these, the following are particularly preferred: ethylene/propylene copolymers (EPR) or ethylene/propylene/diene copolymers (EPDM); polyisobutene; butyl rubbers; halobutyl rubbers, in particular chlorobutyl or bromobutyl rubbers; or mixtures thereof.

The present invention is now further illustrated by the following working examples.

EXAMPLE 1 (COMPARATIVE)

The process was carried out by using a vulcanized rubber product produced by Graneco s.r.l. (Ferrara—Italy). Said product was in the form of vulcanized rubber pellets having dimensions of between 2 and 5 mm and was obtained from the grinding of truck tyres.

The pellets were fed to the main feeding hopper of a co-rotating intermeshing twin-screw extruder having a cylinder diameter of 40 mm and a L/D ratio of 48.

The feeding flow of the vulcanized rubber pellets was set to 20 kg/h and the screw rotation speed of the extruder was set to 300 rpm.

The temperature of the vulcanized rubber powder discharged from the extruder was measured by means of a thermocouple and a value of 56° C. was obtained.

Table 1 shows the grinding yield—expressed in percentage by weight with respect to a total amount of 100 kg of rubber powder discharged from the extruder—with reference to different granulometric ranges of said rubber powder.

In more details, the values of Table 1 have been obtained by sieving—for a period of time of about 6 minutes—the rubber powder discharged from the extruder by using a plurality of sieves of different sizes. For example, the value of 69.82% corresponds to the amount by weight of rubber powder which had a particle size greater than 1000 µm and did not pass through the first sieve having size of 1000 µm, while, for example, the value of 6.86% corresponds to the amount by weight of rubber powder which had a particle size lower than 1000 µm but higher than 800 µm and remained on the sieve having size of 800 µm.

From the data reported in Table 1 it can be calculated that an amount of only 4.67% of the rubber powder discharged from the extruder had a dimension lower than 400 μm, while an amount of only 13.68% of the rubber powder had a dimension lower than 600 μm.

Figure 2:
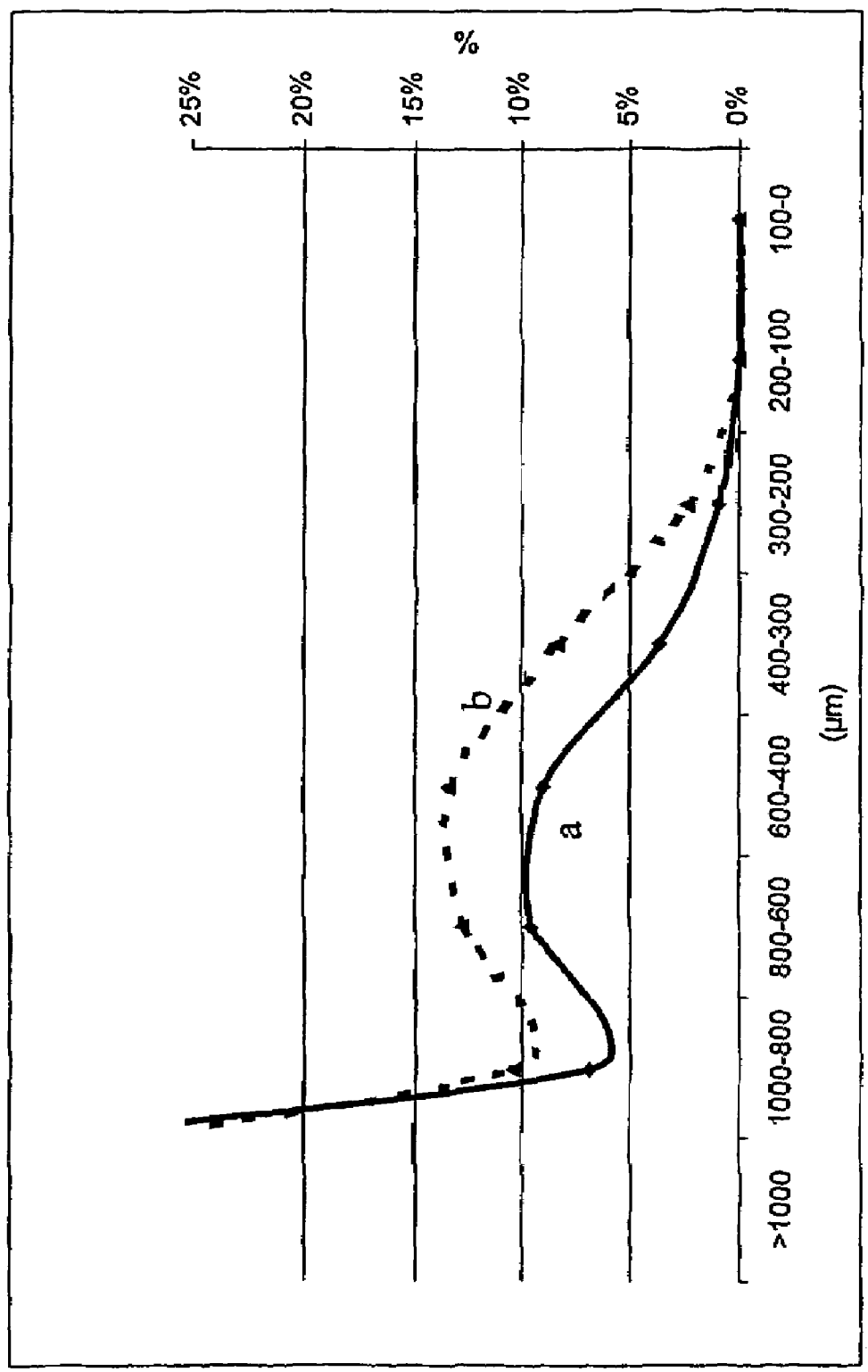
FIG. 2 is a graphic showing the influence of water on the grinding yield of the vulcanized rubber powder obtained from the process according to the present invention.

The data of Example 1 are plotted in FIG. 2 as indicated by curve "a" wherein in abscissa are reported the dimensions of the rubber powder while in ordinates is indicated the grinding yield expressed in percentage.

EXAMPLE 2 (INVENTION)

The process was carried out by using the same vulcanized rubber product and the same twin-screw extruder described in Example 1.

The twin-screw extruder was operated at the same working conditions (in terms of feeding flow and screw rotation speed) as disclosed in Example 1.

The temperature of the vulcanized rubber powder discharged from the extruder was of 31° C. 4% of water—with respect to a total amount of 100 kg of rubber powder discharged from the extruder—was continuously injected into the extruder at a temperature of about 18° C. Said water was fed to the extruder by means of an injection pump and the injection point was located at a distance of 14 diameters from the main hopper.

Table 1 shows the grinding yield—expressed in percentage by weight with respect to a total amount of 100 kg of rubber powder discharged from the extruder—with reference to different granulometric ranges of said rubber powder as described with reference to Example 1.

From the data reported in Table 1 it can be calculated that an amount of 10.79% of the rubber powder discharged from the extruder had a dimension lower than 400 μm, while an amount of 24.21% of the rubber powder had a dimension lower than 600 μm.

Therefore, by comparing the data of Example 1 with the data of Example 2, it can be observed that, thanks to the introduction of the water into the extruder, the amount of rubber powder having dimensions greater than 1000 μm decreased of about 16% (passing from 69.82% of Example 1 to 52.61% of Example 2) and in Example 2, with respect to the corresponding values of Example 1, the amount of rubber powder having dimensions lower than 400 μm and lower than 600 μm was increased of about 6% and 10% respectively.

The data of Example 2 are plotted in FIG. 2 and indicated by curve "b".

TABLE 1

|  |  | Grinding yield (%) | |
|---|---|---|---|
|  |  | Example 1 | Example 2 |
| Rubber powder dimensions (μm) | >1000 | 69.82 | 52.61 |
|  | 800–1000 | 6.86 | 10.43 |
|  | 600–800 | 9.63 | 12.75 |
|  | 400–600 | 9.01 | 13.42 |
|  | 300–400 | 3.66 | 8.35 |
|  | 200–300 | 0.95 | 2.40 |
|  | 100–200 | 0.05 | 0.05 |
|  | <100 | 0.00 | 0.00 |

EXAMPLE 3 (COMPARATIVE)

The process was carried out by using the same vulcanized rubber product and the same twin-screw extruder described in Example 1.

The feeding flow of the vulcanized rubber pellets was set to 40 kg/h and the screw rotation speed of the extruder was set to 300 rpm.

The temperature of the vulcanized rubber powder discharged from the extruder was of 80° C.

Table 2 shows the grinding yield—expressed in percentage by weight with respect to a total amount of 100 kg of rubber powder discharged from the extruder—with reference to different granulometric ranges of said rubber powder.

From the data reported in Table 2 it can be calculated that an amount of only 54.4% of the rubber powder discharged from the extruder had a dimension lower than 1000 μm, while an amount of 33.0% had a dimension lower than 600 μm, an amount of 20.0% had a dimension lower than 420 μm, an amount of 14.8% had a dimension lower than 350 μm, an amount of 4.4% had a dimension lower than 200 μm, and an amount of 1.4% had a dimension lower than 150 μm.

Figure 3:
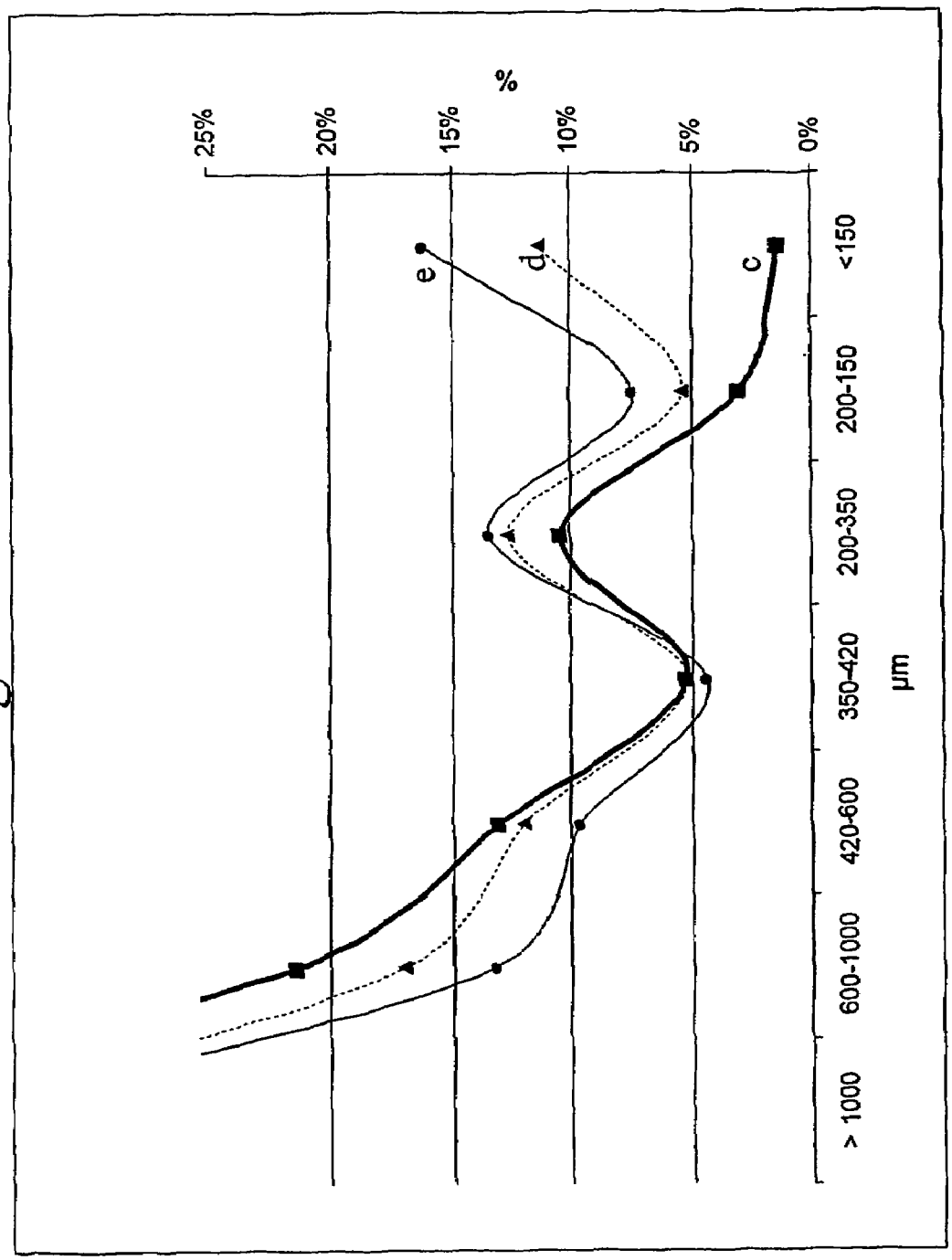
FIG. 3 is a graphic showing the synergistic effect of water and silica on the grinding yield of the vulcanized rubber powder.

The data of Example 3 are plotted in FIG. 3 as indicated by curve "c" wherein in abscissa are reported the dimensions of the rubber powder, while in ordinates is indicated the grinding yield expressed in percentage.

EXAMPLE 4 (COMPARATIVE)

The process was carried out by using the same vulcanized rubber product and the same twin-screw extruder described in Example 1.

The twin-screw extruder was operated at the same working conditions (in terms of feeding flow and screw rotation speed) of Example 3.

The temperature of the vulcanized rubber powder discharged from the extruder was of 77° C.

A silica was used as a grinding aid additive and was introduced into the extruder through the main feeding hopper by means of a gravimetric metering device. The silica amount was of 10% by weight with respect to the amount of rubber material introduced into the extruder. The silica used was Sipernat® 320 which is produced by Degussa and has specific surface area of 175 m²/gr, mean particle size of 15 μm, Mohs hardness of 7 and density of 2.65 g/cm³.

Table 2 shows the grinding yield—expressed in percentage by weight with respect to a total amount of 100 kg of rubber powder discharged from the extruder—with reference to different granulometric ranges of said rubber powder.

From the data reported in Table 2 it can be noted that, by comparing the data of Example 3 with the data of Example 4, thanks to the introduction of the silica into the extruder, the amount of fine rubber powder has increased. For example, it can be noted that the use of the silica has increased the amount of the rubber powder of dimensions in the range from 200 to 350 μm (from 10.40% of Example 3 to 12,60% of Example 4, i.e. with an increment of about 21%), the amount of the rubber powder of dimensions in the range from 150 to 200 μm (from 3.00% of Example 3 to 5.40% of Example 4, i.e. with an increment of about 80%), and the amount of the rubber powder of dimensions lower than 150 μm (from 1.40% of Example 3 to 11,30% of Example 4, i.e. with an increment of about 700%).

From the data reported in Table 2 it can be calculated that an amount of 63.5% of the rubber powder discharged from the extruder had a dimension lower than 1000 μm, while an amount of 46.5% had a dimension lower than 600 μm, an amount of 34.5% had a dimension lower than 420 μm, an amount of 29.3% had a dimension lower than 350 μm, an amount of 16.7% had a dimension lower than 200 μm, and an amount of 11.3% had a dimension lower than 150 μm.

The data of Example 4 are plotted in FIG. 3 and indicated by curve "d".

EXAMPLE 5 (INVENTION)

The process was carried out by using the same vulcanized rubber product and the same twin-screw extruder described in Example 1.

The twin-screw extruder was operated at the same working conditions (in terms of feeding flow and screw rotation speed) as disclosed in Example 3.

The temperature of the vulcanized rubber powder discharged from the extruder was of 44µC.

A silica amount of 5% by weight—with respect to the amount of rubber material introduced into the extruder—was fed to the extruder through the main feeding hopper thereof by means of a gravimetric metering device. The silica used was Sipernat® 320 as described in Example 4.

Furthermore, a water amount of 5% by weight—with respect to the total amount of rubber material—was continuously injected into the extruder through an injection point as described in Example 2. The water was at a temperature of about 18° C.

Table 2 shows the grinding yield—expressed in percentage by weight with respect to a total amount of 100 kg of rubber powder discharged from the extruder—with reference to different granulometric ranges of said rubber powder.

From the data reported in Table 2 it can be noted that, by comparing the data of Example 4 with the data of Example 5, thanks to the introduction into the extruder of 5% by weight of water in place of 5% by weight of silica (so that only 5% by weight of silica was used), the amount of fine rubber powder has remarkably increased pointing out the synergistic effect of silica and water. For example, it can be noted that the amount of the rubber powder of dimensions in the range from 200 to 350 µm has increased (from 12.6% of Example 4 to 13.4% of Example 5, i.e. with an increment of about 6%), as well as the amount of the rubber powder of dimensions in the range from 150 to 200 µm (from 5.4% of Example 4 to 7.4% of Example 5, i.e. with an increment of about 37%), and the amount of the rubber powder of dimensions lower than 150 µm (from 11.3% of Example 5 to 16.2% of Example 5, i.e. with an increment of about 43%).

From the data reported in Table 2 it can be calculated that an amount of 64.2% of the rubber powder discharged from the extruder had a dimension lower than 1000 µm, while an amount of 51.0% had a dimension lower than 600 µm, an amount of 41.4% had a dimension lower than 420 µm, an amount of 37.0% had a dimension lower than 350 µm, an amount of 23.6% had a dimension lower than 200 µm, and an amount of 16.2% had a dimension lower than 150 µm.

Furthermore, by combining the data reported in Table 2, it can be noted that the addition of water and silica to the rubber material allows to remarkably: increase the grinding yield in fine particles, i.e. in particles having dimensions lower than 350 µm, preferably lower than 200 µm.

The data of Example 4 are plotted in FIG. 3 and indicated by curve "e".

TABLE 2

| | | Example 3 | Example 4 | Example 5 |
|---|---|---|---|---|
| Rubber powder dimensions (µm) | >1000 | 45.40 | 36.40 | 35.60 |
| | 600–1000 | 21.40 | 17.00 | 13.20 |
| | 420–600 | 13.00 | 12.00 | 9.60 |
| | 350–420 | 5.20 | 5.20 | 4.40 |
| | 200–350 | 10.40 | 12.60 | 13.40 |
| | 200–150 | 3.00 | 5.40 | 7.40 |
| | <150 | 1.40 | 11.30 | 16.20 |

The invention claimed is:

1. A process for producing a rubber powder from a vulcanized rubber material comprising the steps of:
    feeding a grinding device with said vulcanized rubber material;
    introducing at least one liquid coolant into said grinding device;
    contacting said vulcanized rubber material with said at least one liquid coolant;
    introducing at least one grinding aid additive into said grinding device;
    operating the grinding device so as to grind said vulcanized rubber material to form said rubber powder; and
    discharging said rubber powder from said grinding device.

2. The process according to claim 1, wherein the grinding aid additive is introduced into the grinding device through at least one feeding inlet together with the vulcanized rubber material.

3. The process according to claim 1, wherein the introduction of the liquid coolant into the grinding device is carried out by means of at least one further feeding inlet.

4. The process according to claim 3, wherein said at least one further feeding inlet is an injection point of the liquid coolant.

5. The process according to claim 1 or 2, wherein the introduction of the liquid coolant into the grinding device is carried out by means of said at least one feeding inlet.

6. The process according to claim 1, wherein the introduction of the liquid coolant into the grinding device is carried out by dripping.

7. The process according to claim 1, further comprising the step of reducing the vulcanized rubber material into shreds before the step of feeding.

8. The process according to claim 7, further comprising the step of size reducing said shreds into chips of dimensions lower than the dimensions of said shreds.

9. The process according to claim 8, further comprising the step of separating metallic material from the rubber material reduced into chips.

10. The process according to claim 9, wherein the metallic material is separated by means of a magnetic separator.

11. The process according to claim 8, further comprising the step of separating textile material from the rubber material reduced into chips.

12. The process according to claim 1, further comprising the step of separating a remaining amount of textile material from the rubber powder exiting from the grinding device.

13. The process according to claim 11 or 12, wherein the textile material is separated by sieving.

14. The process according to claim 1, wherein said rubber powder is sieved and then at least part of said rubber powder is recycled.

15. The process according to claim 1, wherein said liquid coolant is water.

16. The process according to claim 15, wherein said water is at a temperature not greater than 30° C.

17. The process according to claim 16, wherein said temperature is not greater than 20° C.

18. The process according to claim 1, wherein said liquid coolant is an aqueous emulsion of at least one polymeric material.

19. The process according to claim 1, wherein said liquid coolant is an aqueous suspension of at least one polymeric material.

20. The process according to claim 1, wherein said liquid coolant is introduced into the grinding device in an amount not greater than 20% by weight with respect to the amount of said vulcanized rubber material.

21. The process according to claim 20, wherein said amount is between 0.5% and 10% by weight with respect to the amount of the rubber material.

22. The process according to claim 1, wherein said at least one grinding aid additive is selected from: silica, silicates, metal oxides, metal carbonates, and mixtures thereof.

23. The process according to claim 1, wherein said at least one grinding aid additive is introduced into the grinding device in an amount not greater than 20% by weight with respect to the amount of said vulcanized rubber material.

24. The process according to claim 23, wherein said amount is between 0.5% and 10% by weight with respect to the amount of the rubber material.

25. The process according to claim 1, wherein said grinding device is a mill.

26. The process according to claim 1, wherein said grinding device is an extruder, said extruder comprising a barrel and at least one screw rotatably mounted into said barrel.

27. The process according to claim 1, wherein said grinding device is a shredder.

28. The process according to claim 1, wherein said grinding device is a granulator.

29. The process according to claim 1, wherein said grinding device is a Banbury mixer.

30. The process according to claim 26, wherein the operation of the extruder comprises at least one step of conveying the vulcanized rubber material along the extruder and at least one step of grinding the vulcanized rubber material within the extruder.

31. The process according to claim 26, wherein the step of contacting the rubber is carried out by introducing the liquid coolant into the extruder barrel.

32. The process according to claim 30, wherein the step of introducing the liquid coolant is performed during said at least one step of conveying.

33. The process according to claim 1 or 30, wherein the step of introducing the liquid coolant is performed in association with said at least one step of grinding.

34. The process according to claim 1 or 30, wherein the step of introducing the liquid coolant is performed during said step of grinding.

35. The process according to claim 1 or 30, wherein the step of introducing the liquid coolant is performed before said step of grinding.

36. The process according to claim 30, wherein the liquid coolant is introduced into said extruder through at least one feeding inlet.

37. The process according to claim 36, wherein said feeding inlet is a main feeding hopper.

38. The process according to claim 36, wherein said feeding inlet is an injection point.

39. The process according to claim 36, wherein said feeding inlet is a lateral feeding inlet.

40. The process according to claim 38, wherein said feeding inlet is positioned in correspondence of at least one kneading element of said screw.

41. The process according to claim 39, wherein said feeding inlet is positioned in correspondence of at least one kneading element of said screw.

42. The process according to claim 38, wherein said feeding inlet is positioned in correspondence of a conveying element of said screw, said conveying element being positioned immediately upstream of a kneading element of said screw.

43. The process according to claim 39, wherein said feeding inlet is positioned in correspondence of a conveying element of said screw, said conveying element being positioned immediately upstream of a kneading element of said screw.

44. The process according to claim 26, wherein said at least one grinding aid additive is introduced into said extruder through at least one feeding inlet.

45. The process according to claim 44, wherein said feeding inlet is a main feeding hopper.

46. The process according to claim 44, wherein said feeding inlet is a lateral feeding inlet.

47. The process according to claim 1, wherein the temperature of the rubber powder discharged from the grinding device is not greater than 100° C.

48. The process according to claim 47, wherein said temperature is not greater than 60° C.

49. The process according to claim 1, wherein said vulcanized rubber material comprises at least one synthetic or natural elastomeric polymer.

50. The process according to claim 1, wherein said vulcanized rubber material derives from discarded tyres.

* * * * *